US008321122B2

(12) United States Patent
Ray

(10) Patent No.: US 8,321,122 B2

(45) Date of Patent: Nov. 27, 2012

(54) SYSTEM AND METHOD FOR EVIDENTIAL REASONING FOR TRANSPORTATION SCENARIOS

(75) Inventor: Gary A. Ray, Issaguah, WA (US)

(73) Assignee: The Boeing Company, Chicago, IL (US)

( * ) Notice: Subject to any disclaimer, the term of this patent is extended or adjusted under 35 U.S.C. 154(b) by 639 days.

(21) Appl. No.: 11/946,782

(22) Filed: Nov. 28, 2007

(65) Prior Publication Data

US 2009/0138186 A1 May 28, 2009

(51) Int. Cl.

*G06F 19/00* (2006.01)
*G06G 7/76* (2006.01)
*G08G 1/01* (2006.01)
*G08G 1/017* (2006.01)
*G08G 1/123* (2006.01)

(52) U.S. Cl. ........ 701/117; 701/409; 701/532; 340/933; 340/937; 340/995.13

(58) Field of Classification Search ...... 701/1, 116–119, 701/205, 208, 300, 301, 400, 409, 414; 340/905, 340/933, 935–937, 988–990, 995.13, 995.19, 340/995.25

See application file for complete search history.

(56) References Cited

U.S. PATENT DOCUMENTS 4,839,648 A * 6/1989 Beucher et al. ............... 340/933
5,444,442 A * 8/1995 Sadakata et al. .............. 340/916
5,554,984 A * 9/1996 Shigenaga et al. ............ 340/937
5,982,298 A * 11/1999 Lappenbusch et al. ....... 340/905
6,297,748 B1 * 10/2001 Lappenbusch et al. ....... 340/905
6,405,132 B1 * 6/2002 Breed et al. .................... 701/301
6,429,812 B1 * 8/2002 Hoffberg .................... 342/357.1
6,463,382 B1 * 10/2002 Bullock ........................ 701/117
2002/0193938 A1 * 12/2002 DeKock et al. ............... 701/117
2008/0045242 A1 * 2/2008 Dekock et al. ............ 455/456.2

FOREIGN PATENT DOCUMENTS

JP 10-42282 2/1998
JP 2001-229488 8/2001
WO WO 2006-105541 10/2006

OTHER PUBLICATIONS

British Search Report dated Mar. 24, 2009.
Video Based Multi-Agent Traffic Surveillance System—Modest Consortium—Proceedings of the 2000 Intelligent Vehicles Conference, Dearborn, MI USA Oct. 4-5, 2000.
Optical Flow Based Vehicle Tracking Strengthened by Statistical Decisions—Nejadasl et al., ISPRS Journal of Photogrammetry & Remote Sensing 61 (2006) 159-169.

(Continued)

*Primary Examiner* — Thomas Tarcza
*Assistant Examiner* — Edward Pipala
(74) *Attorney, Agent, or Firm* — Caven & Aghevli LLC

(57) ABSTRACT

The system contains a programmable device. At least one camera is in communication with the programmable device. The camera is directed towards at least one road. The camera provides a camera signal to the programmable device. A map of an area, which includes the road, is stored in a memory of the programmable device. A plurality of traffic influences is defined in the map. A first program on the programmable device tracks vehicles on the road utilizing the camera signal. The first program recognizes at least one obstruction and communicates with the map to identify at least one of the traffic influences behind the obstruction.

20 Claims, 8 Drawing Sheets

OTHER PUBLICATIONS

Multi-Camera Target Tracking in Blind Regions of Cameras with Non-Overlapping Fields of View—Chilgunde et al.—BMVC 2004, Kingston, Sep. 7-9, 2004.

Non Overlapping Distributed Tracking using Particle Filter—Leoputra et al., $18^{th}$ International Conference on Pattern Recognition ICPR, Hong Kong Aug. 2006.

* cited by examiner

SYSTEM AND METHOD FOR EVIDENTIAL REASONING FOR TRANSPORTATION SCENARIOS

FIELD

The present disclosure is generally related to traffic monitoring systems and, more particularly, is related to a system and method for evidential reasoning for transportation scenarios.

BACKGROUND

Presently, technology exists and is in practice for monitoring traffic in cities and other locations. Traffic is monitored using cameras that may be mounted on buildings or similar structures, on airborne vehicles, or in space on satellites or other structures. Software is used with these cameras to allow monitoring of movement of individual vehicles in traffic. However, physical limitations of the cameras and logic limitations on the software limit the usefulness of this technology.

One problem for traffic monitoring systems is tall buildings. Buildings present obstructions to traffic, as do tunnels, bridges, and other significant structures. Even large trucks can provide obstructions for cameras, dependent upon the position of the camera. Traffic monitoring software will identify vehicles in view and tag them with a reference number. Relative to the view of the cameras, vehicles will pass behind an obstruction on one side of the obstruction and emerge from the other side. Most traffic monitoring software has no means for quickly matching the emerging vehicles with the vehicles that went behind the obstruction, but tag them with new reference numbers and then, later, the reference numbers may be interconnected manually or automatically. In either case, with respect to real time, the vehicles are 'lost' once they travel behind an obstruction. High frequency of 'lost' vehicles limit the usefulness of traffic monitoring systems and traffic monitoring systems that cannot properly account for vehicles that pass behind obstructions provide a high frequency of 'lost' vehicles.

Some traffic monitoring systems are slightly more advanced. These traffic monitoring systems will attempt to measure a vehicle frame and associate tags of vehicles passing behind obstructions based on order into the obstruction and order out, using vehicle frame measurements to verify and apply corrective changes to the logic. Unfortunately, other traffic influences can exist behind obstructions that significantly impair this logic. Specifically, parking garage exits and entrances, traffic lights, double-parked vehicles, construction, intersections and many other traffic influences greatly influence traffic flow behind obstructions and can cause improper association of vehicles, which becomes corrupt data.

Thus, a heretofore unaddressed need exists in the industry to address the aforementioned deficiencies and inadequacies.

SUMMARY

Briefly described, the present disclosure provides a traffic monitoring system containing a programmable device. At least one camera is in communication with the programmable device. The camera is directed towards at least one road. The camera provides a camera signal to the programmable device. A map of an area, which includes the road, is stored in a memory of the programmable device. A plurality of traffic influences is defined in the map. A first program on the programmable device tracks vehicles on the road utilizing the camera signal. The first program recognizes at least one obstruction and communicates with the map to identify at least one of the traffic influences behind the obstruction.

The present disclosure also provides a method for tracking vehicles by directing at least one camera towards at least one road; collecting traffic information from the at least one road through the at least one camera; communicating the collected traffic information to a programmable device; comparing collected traffic information with a map of an area that includes the road, wherein the map is stored in a memory of the programmable device and wherein a plurality of traffic influences are defined in the map; and tracking vehicles on the road, wherein a first program recognizes at least one obstruction of the road and communicates with the map to identify at least one of the traffic influences behind the obstruction.

The present disclosure also provides a system for monitoring traffic, the system comprising at least one camera directed towards at least one road for collecting traffic information concerning the at least one road and for tracking vehicles on the road. A computer having a computer readable program is provided for comparing collected traffic information with a stored map of an area that includes the road, wherein a plurality of traffic influences are defined in the map, for recognizing at least one obstruction of the road, and for communicating with the map to identify at least one of the traffic influences behind the obstruction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The features, functions and advantages that have been discussed can be achieved independently in various embodiments of the present disclosure or may be combined in yet other embodiments further details of which can be seen with reference to the following description and drawings, wherein like numerals depict like parts, and wherein.

DESCRIPTION

Figure 1:
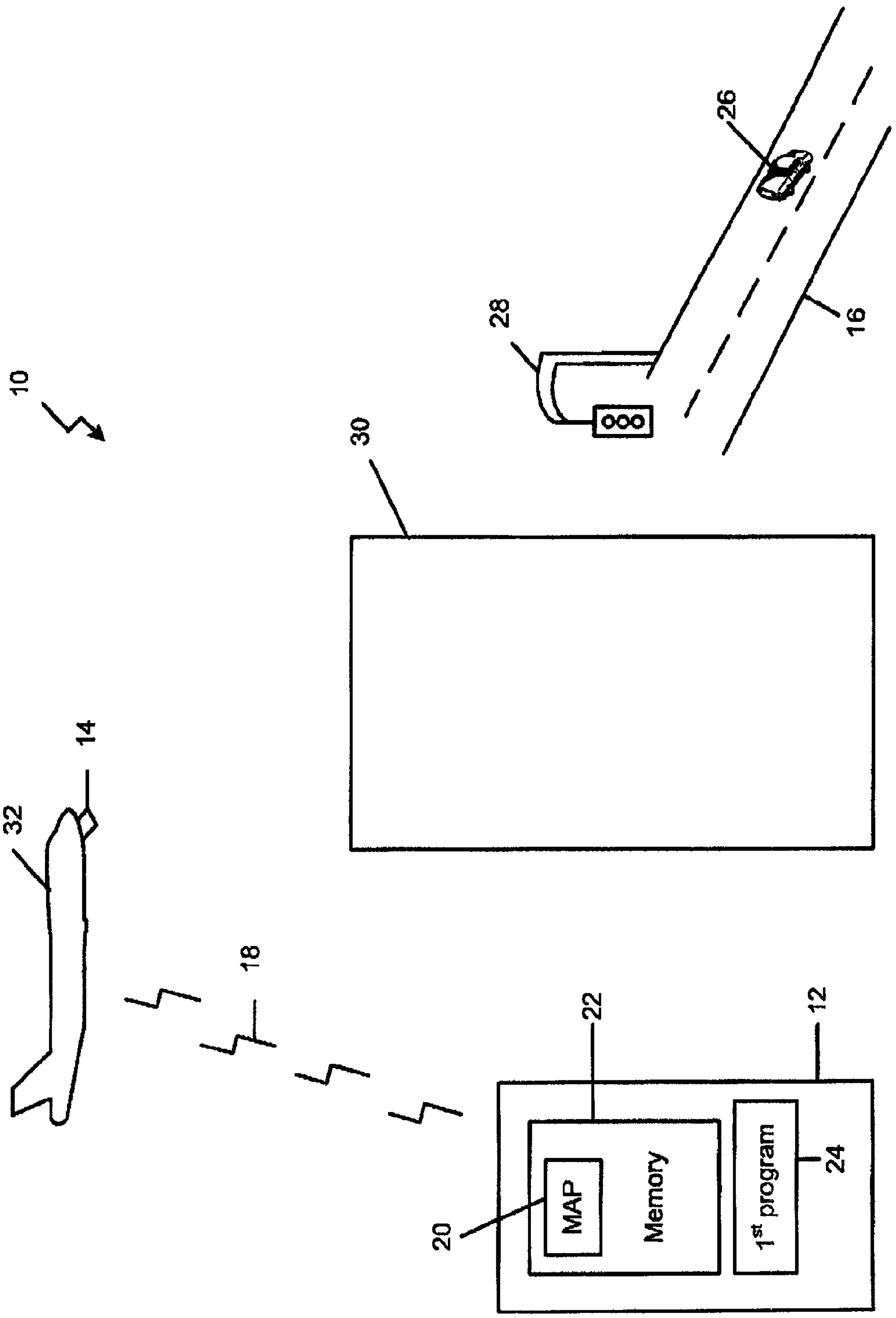
FIG. 1 is a schematic illustrating a traffic monitoring system, in accordance with a first exemplary embodiment.

FIG. 1 is a block diagram illustrating a traffic monitoring system 10, in accordance with a first exemplary embodiment of the present disclosure. The traffic monitoring system 10 contains a programmable device 12. At least one camera 14 is in communication with the programmable device 12. The camera 14 is directed towards at least one road 16. The camera 14 provides a camera signal 18 to the programmable device 12. A map 20 of an area, which includes the road 16, is stored in a memory 22 of the programmable device 12. A plurality of traffic influences 28 (only one is shown in FIG. 1) is defined in the map 20. A first program 24 on the programmable device 12 tracks vehicles 26 on the road 16 utilizing the camera signal 18. The first program 24 recognizes at least one obstruction 30 and communicates with the map 20 to identify at least one of the traffic influences 28 behind the obstruction 30.

The programmable device 12 is presently envisioned as a plurality of workstations networked together. However, the programmable device 12 may be a personal computer, a laptop, a handheld electronic device, a combination of devices, or any electronics capable of performing the operations described herein for the programmable device 12.

As shown in FIG. 1, the camera 14 may be mounted to a plane 32. The plane 32 may be either manned or unmanned and the camera 14 may be controlled remotely, from the plane 32, manually or automatically, or may be without options to control. The camera 14 may also be mounted to a stationary structure, such as traffic poles, light standards, buildings, parking garages, bridges, tunnels, or other structures. The camera 14 may be mounted to other mobile bases, including, for example, cars, trucks, balloons, or helicopters. The camera 14 may be part of a satellite or other space-based system. The camera 14 may capture visual information, identify objects through radar, track non-visual signatures such as infrared, or any other remotely captured information that could be used to track and at least partially identify moving vehicles 26. While only one camera 14 is shown in FIG. 1, a plurality of cameras 14 may be utilized having camera signals 18 capturing at least one type of information (visual, radar, etc.) that may be integrated to provide a more complete and coordinated understanding of vehicular travel patterns.

The camera signal 18 transmitted from the camera 14 to the programmable device 12 may utilize any known or to be known communication device. While the camera signal 18 is illustrated utilizing a wireless communication device in transmission to the programmable device 12, it may be that the camera signal 18 is transmitted using a wired signal, that the programmable device 12 is local or even integral with the camera 14, or that the camera signal 18 is transmitted utilizing multiple types of communication systems. Those having ordinary skill in the art know various systems of signal transmission and all such systems are contemplated by and considered to be within the scope of the present disclosure.

FIG. 1 provides a very simple depiction of a road 16. The road 16 may be a single lane road for one-way traffic, a road with two-way traffic, a multi-lane highway, a part of a bridge, a rotary circle, a parking garage, or any other type of road imaginable. The road 16 may also include paved areas, access roads, and anywhere else vehicles may travel.

The vehicles 26 may include any motorized vehicle, including, but not limited to cars, buses, motorcycles, construction vehicles. Vehicles 26 may also include bicycles or other manual vehicles. The traffic influences 28 may include street parking, streetlights, crosswalks, double parked vehicles, traffic jams, turn-offs (such as side roads or parking garages), emergency vehicles, or anything else that can cause a vehicle to vary from straight travel at a standard speed. It should be noted that some traffic influences 28, such as double parked vehicles or emergency vehicles, are dynamic influences that may become part of the map 20 temporarily. Also, traffic influences 28 do not need to be identified with specificity, so long as their influence on traffic patterns is quantified.

Figure 2:
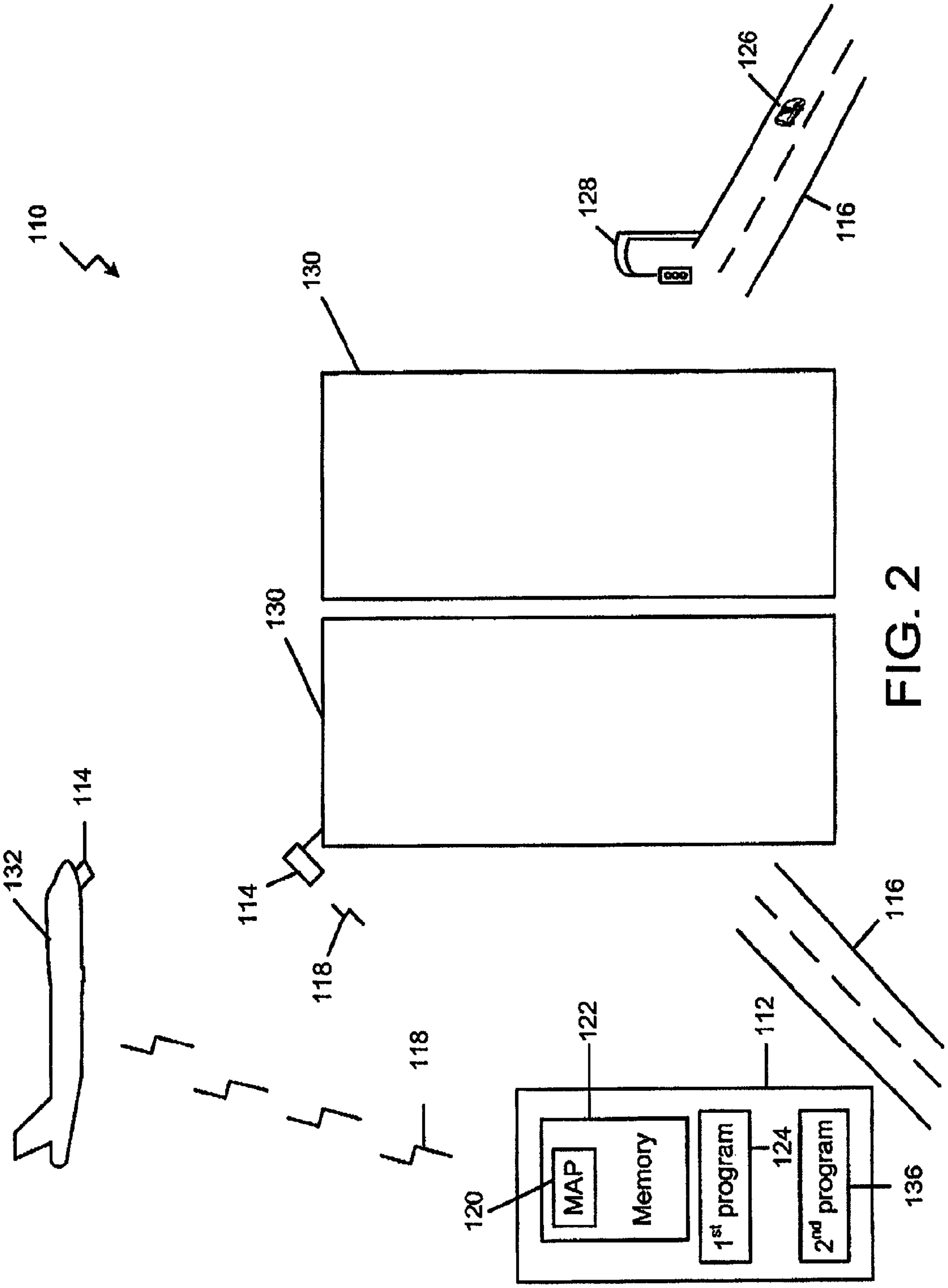
FIG. 2 is a schematic illustrating a traffic monitoring system, in accordance with a second exemplary embodiment.

FIG. 2 is a block diagram illustrating a traffic monitoring system 110, in accordance with a second exemplary embodiment. The traffic monitoring system 110 contains a programmable device 112. A plurality of cameras 114 is in communication with the programmable device 112. The cameras 114 are directed towards a plurality of roads 116. The cameras 114 each provide a camera signal 118 to the programmable device 112. A map 120 of an area, which includes the roads 116, is stored in a memory 122 of the programmable device 112. A plurality of traffic influences 128 (only one is shown in FIG. 2) is defined in the map 120. A first program 124 on the programmable device 112 tracks vehicles 126 on the roads 116 utilizing the camera signals 118. The first program 124 recognizes at least one obstruction 130 and communicates with the map 120 to identify at least one of the traffic influences 128 behind the obstruction 130.

The map 120 is considered to be substantially constructed prior to tracking vehicles 126. Vehicles 126 may be assumed to enter the area covered by the map 120, move along the mapped area for a while, and then exit the mapped area. Exiting the mapped area could involve entering a parking lot, going down a driveway, or going off-road entirely. Tracking may be done while on the roads 116 of the area within the map 120 based on fused sensor information (could be video, radar, ground sensors, etc) from the cameras 114. Also, processing at the programmable device 112 may be done to estimate traffic influences 128 such as states of traffic signals and average speeds and blockages, which are continuously estimated based on knowledge of traffic simulation. In addition, static traffic influences 128 would be available including stop sign locations. Beyond cameras 114, other traffic information may be fed to the map 120. For example, traffic signals from a traffic light could be fed to a map 120 from the source rather than from a camera 114 or other external sensing equipment.

Figure 3:
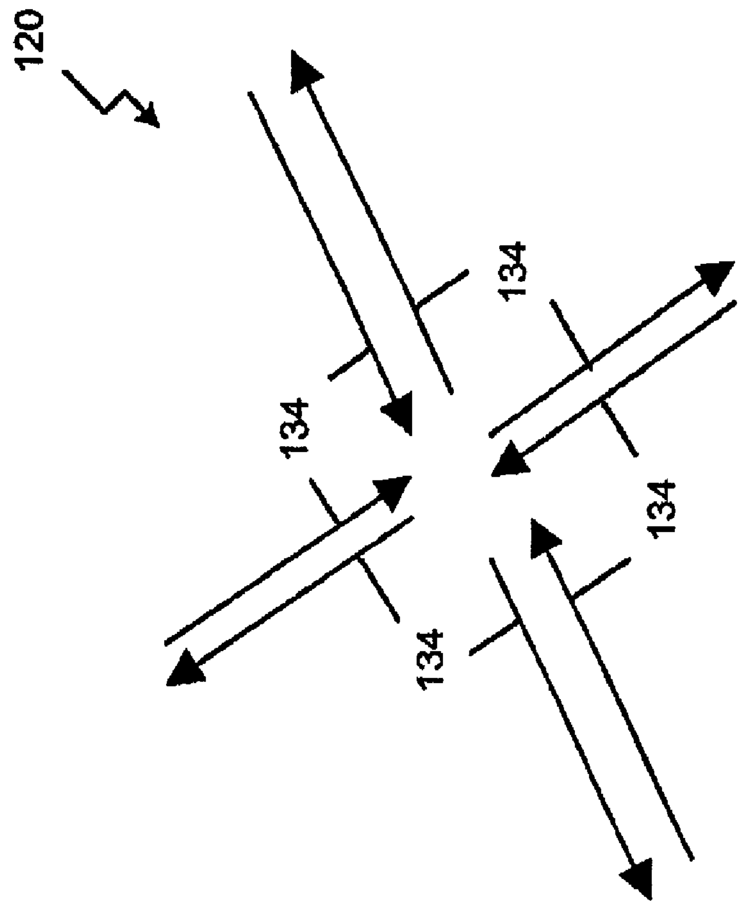
FIG. 3 is an overhead illustration of a portion of a map for the traffic monitoring system of FIG. 2, in accordance with the second exemplary embodiment.

FIG. 3 is an overhead illustration of a portion of a map 120 for the traffic monitoring system 110 of FIG. 2, in accordance with the second exemplary embodiment. The map 120 is represented by a directed graph showing a direction of travel (two segments 134 for a two lane, two way road for example). The segments 134 may be split into small sections where uniform estimates are computed on average speed, etc. Attached to this is metadata showing the possible actions (enter, exit, go straight, turn left, etc) for each segment 134. Also attached to this is metadata that shows all the static traffic influences 128 influencing segments 134 for cameras 114 that are stationary (for example, this captures the information about obscurations of fixed cameras on existing buildings). This and other captured metadata from the traffic information may also be associated with each segment 134.

A vehicle 126 may then be tagged with specific information associated therewith. The tag information may include: measured motion parameters for the vehicle 126 such as speed, location, graph segment, etc.; measured identifying data such as color, shape, length/width ratio, appearance model, and other static vehicle 126 information; and probability vectors containing ID estimates, as will be discussed further herein. Reasonable assumptions on how traffic behaves may be utilized in order to continuously update this tracking information based on detection of events. Utilizing assumptions allows use of both positive and negative information (e.g. vehicle is not anywhere else, so must be in the only remaining road segment 134), rather than relying solely on positive information (e.g. vehicle 126 is here because it has been seen continuously for the past N frames).

Figure 4A:
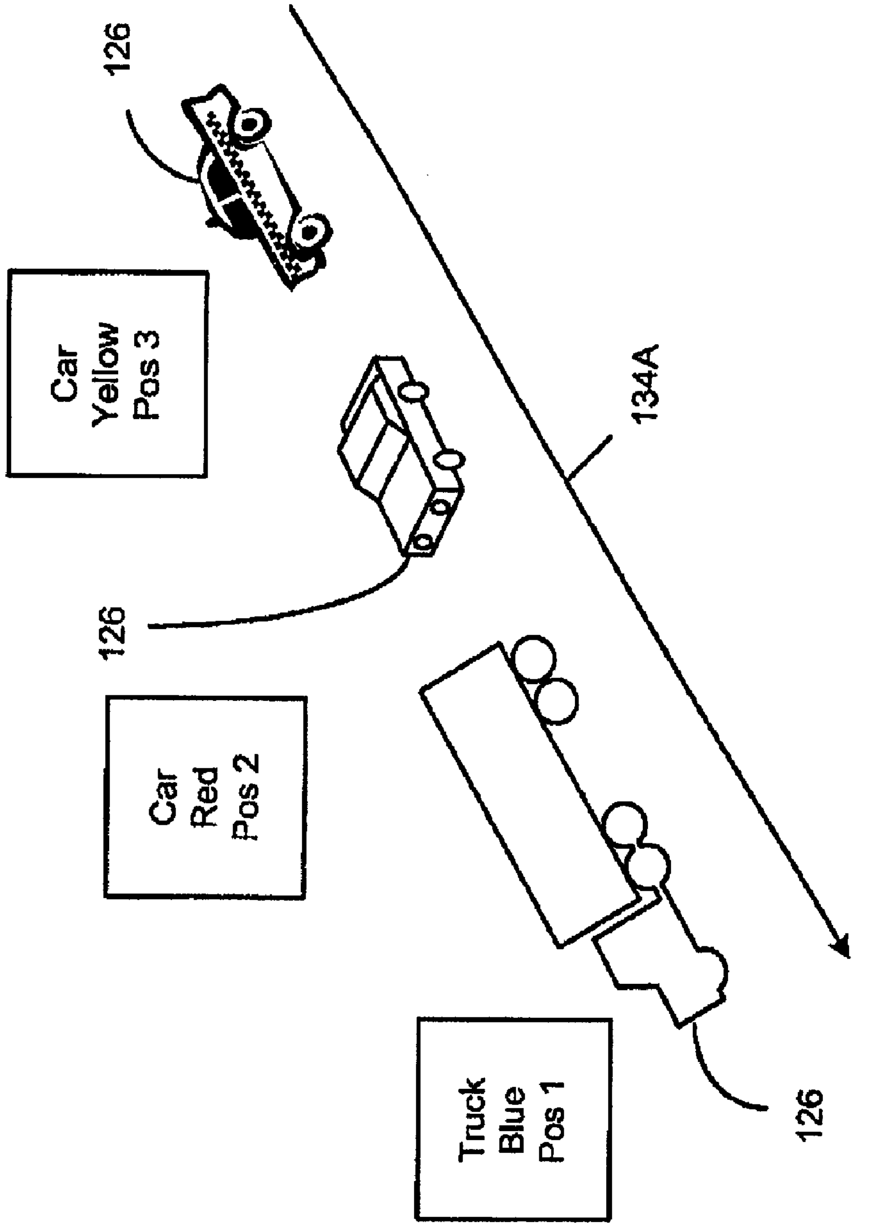
FIG. 4A is an overhead illustration of three vehicles on a single lane road for the traffic monitoring system of FIG. 2, in accordance with the second exemplary embodiment.
Figure 4B:
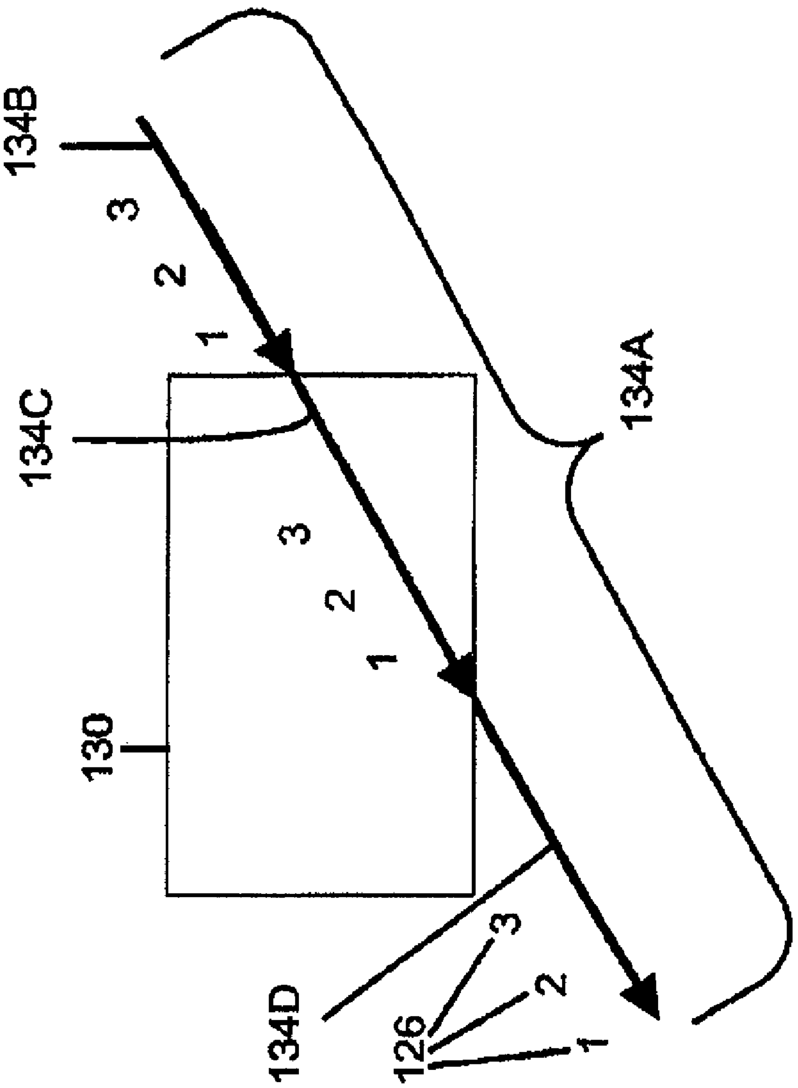
FIG. 4B is an overhead illustration of a portion of a map representation of the illustration of FIG. 4A, in accordance with the second exemplary embodiment.

FIG. 3 shows a two-lane bidirectional road segment with a four-way intersection, which is represented by eight directed segments 134. FIG. 4A is an overhead illustration of three vehicles 126 on a single road segment 134A for the traffic monitoring system 110 of FIG. 2, in accordance with the second exemplary embodiment of the present disclosure. A truck is shown in position 1 and cars are shown in position 2 and position 3 on FIG. 4A FIG. 4B is an overhead illustration of a portion of a map 120 representation of the illustration of FIG. 4A, in accordance with the second exemplary embodiment. FIG. 4B shows numbers '1, 2, and 3' representing the vehicles 126 in position 1, position 2, and position 3 on FIG. 4A. Also shown is an obstruction 130. Because of the obstruction 130, the single road segment 134A of FIG. 4A has been divided into a first road segment 134B, a second road segment 134C, and a third road segment 134D. Because of the obstruction 130, when the vehicles 1, 2, 3 reach the second road segment 134C they are essentially invisible to the camera 114 (shown in FIG. 2). The assumption portrayed in FIG. 4B is that the three vehicles 126 travel in the same order in the third road segment 134D as they traveled in the first road segment 134 at the average speed for second road segment 134B during the obscuration. That assumption may be validated when the 3 vehicles come out of the obscuration through comparison with color/shape/etc. Other possible events include: a vehicle 126 can stop and exit the area of the map 120, a vehicle can turn off onto a side road, and one vehicle 126 can pass another. A second program 136 within the programmable device 112 may be utilized for calculating the number of event possibilities and the probability of each.

Figure 4C:
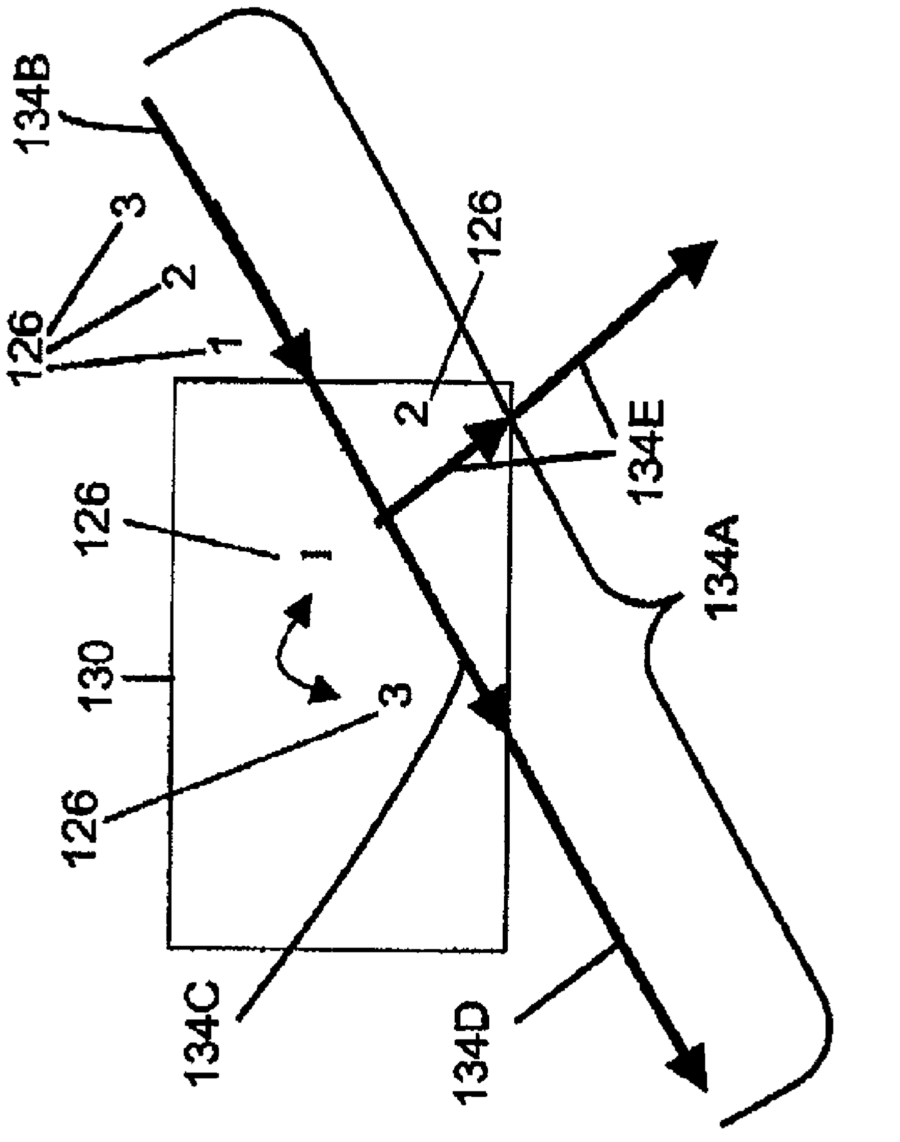
FIG. 4C is a second overhead illustration of a portion of a map representation of the illustration of FIG. 4A, in accordance with the second exemplary embodiment.

FIG. 4C is a second overhead illustration of a portion of a map 120 representation of the illustration of FIG. 4A, in accordance with the second exemplary embodiment. As represented in FIG. 4C, the vehicle 126 in position 2 turns down a side road (segments 134E) and the vehicle 126 in position 3 passes the vehicle 126 in position 1. This vehicle activity behind the obstruction 130 is more difficult to track. Further, as the vehicles 126 in positions 2 and 3 are both cars, if the programmable device 112 lacks the data to distinguish between the cars (e.g., similar size and color), the first program 124 may not be able to determine with 100% certainty whether the vehicle 126 in position 2 or the vehicle 126 in position 3 turned down the side road segment 134E. However, based on the speed with which the vehicle 126 in position 2 emerged from behind the obstruction 130 compared to speed with which the vehicle 126 in position 3 emerged from behind the obstruction 130, the second program 126 may be able to assign effective probabilities to determine which vehicle turned down the side road.

Overall, there are at least four types of event transformations that may be considered: permutations, insertions, deletions, and transitions. A permutation transforms the order of car identities that are traveling down a road 116. For example, a permutation is caused by one car passing another. An insertion adds a car into a road segment 134. An insertion represents a car "coming into existence" as far as the transportation network is concerned. For example, parked cars entering a road or coming out of a garage would be considered insertions. A deletion removes a car from a road segment 134. A deletion represents a car "going out of existence" as far as the transportation network is concerned. An example would be a car entering a parking lot or a garage. A transition takes a car from one road segment 134 to another. An example would include a car turning from one road onto another.

As mentioned previously, the map 120 may include a collection of segments 134. Each segment 134 may include indications such as direction of travel, length of each segment 134, average speed on each segment 134, foreseeable obscurations as separate segments 134, intersection possibilities, etc. The metadata for each segment 134 may be updated as frequently as desired. The metadata may also alter the segmentation of the map. For example, a newly introduced obstruction could become a splitting point for dividing a single segment 134A into smaller segments 134B, 134C, 134D. Different average speeds on different portions of a segment 134 could also be a ground for separating the segment 134 into smaller segments 134.

The map 120 can be represented by multiple copies of a digraph, which represents the roadways that are being modeled. Each segment 134 would have from none to many alternate segments overlaid. These segments 134 may carry fixed metadata associated with that segment 134 (length, average speed, etc.) together with unique combinations of vehicles 126 that have a "possibility" of being on that segment 134. These "multiple-possibility" pictures of each segment 134 are one means of recording and working with sensor blockages. Under this traffic monitoring system 110, virtual vehicles continue traveling and having events happen to them under simulation along roadways in configurations that may or may not actually happen. As time progresses, the virtual vehicles should come out from obstructed segments 134 and evidential reasoning would take place to resolve differences between observation and these various simulations.

The first program 124 may turn camera signals 118 and other input into transportation events. For example, consider the process of detecting a permutation, such as passing. It is difficult to try and base permutation detection on tracking all vehicles 126 over all camera signals 118 and decide when passing occurs. However, the first program 124 may attempt to identify a simpler set of sensor "sub events" to detect passing. For example, one piece could be detection of lane change. Another would be having one car change from being behind to ahead of another car. Then simpler steps could be used to detect at least one of the passing event Car A passes Car B: Car A is behind Car B in the same lane; Car A changes to another lane; Car A is ahead of Car B; and Car A changes back to its original lane. Note that each decision is localized spatially and in time. Detecting smaller elements of an event may be easier than tracking an event through all of its motion.

Figure 5:
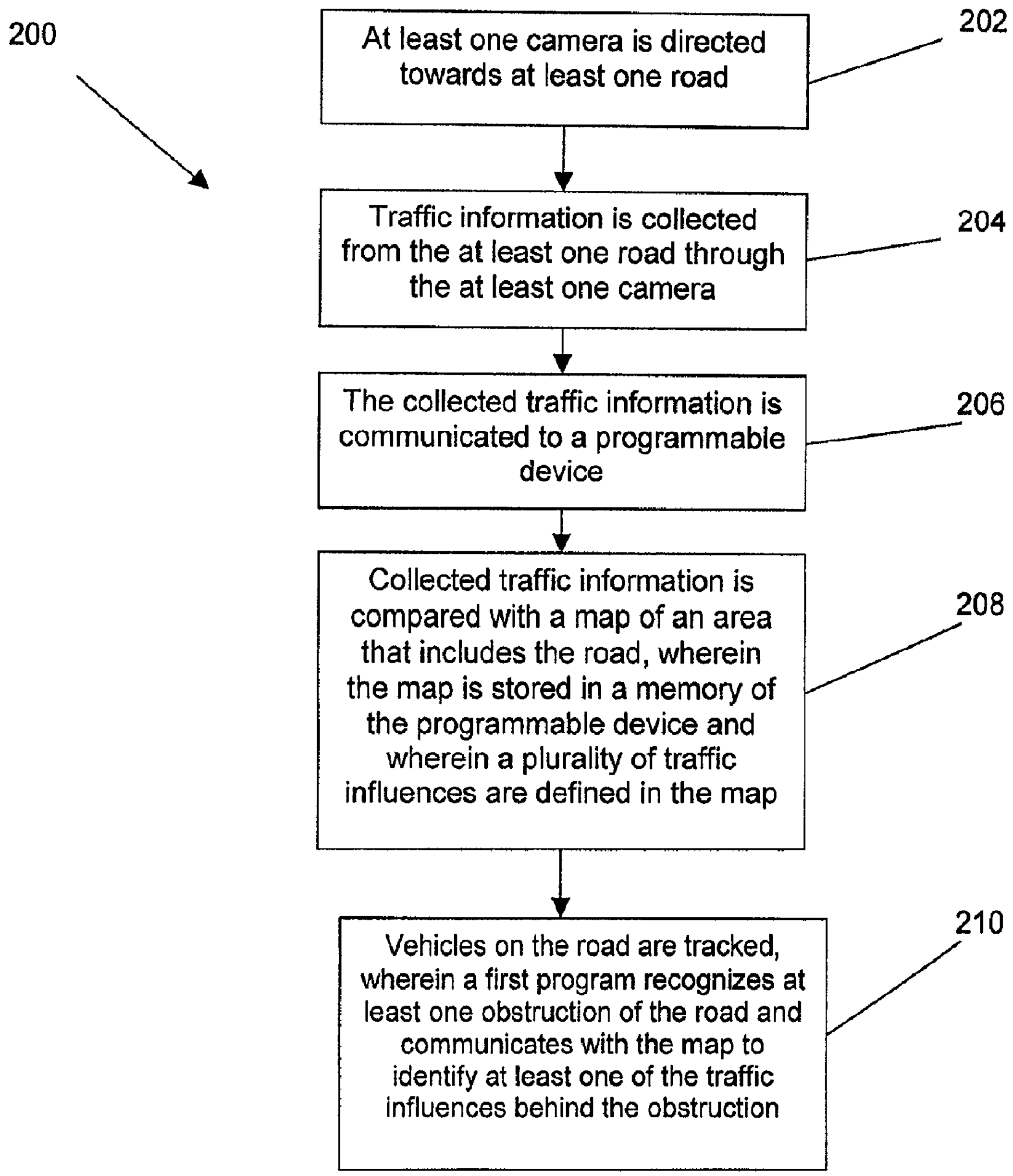
FIG. 5 is a flowchart illustrating a method for monitoring traffic utilizing the abovementioned traffic monitoring system in accordance with the first exemplary embodiment.

FIG. 5 is a flowchart 200 illustrating a method for monitoring traffic utilizing the abovementioned traffic monitoring system 10 in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art.

As is shown by block 202, at least one camera 14 is directed towards at least one road 16. Traffic information is collected from the at least one road 16 through the at least one camera 14 (block 204). The collected traffic information is communicated to a programmable device 12 (block 206). Collected traffic information is compared with a map 20 of an area that includes the road 16, wherein the map 20 is stored in a memory 22 of the programmable device 12 and wherein a plurality of traffic influences 28 are defined in the map 20

(block 208). Vehicles 26 on the road are tracked, wherein a first program 24 recognizes at least one obstruction 30 of the road 16 and communicates with the map 20 to identify at least one of the traffic influences 28 behind the obstruction 30 (block 210).

The method may also include storing map information in the memory, wherein the map information comprises vehicle behavior patterns on the road. Behavior of at least one vehicle that passes behind the obstruction may be predicted based on vehicle behavior patterns on the road. Further, vehicles 26 passing out from behind the obstruction 30 may be matched with vehicles 26 that previously passed behind the obstruction 30 based on vehicle behavior patterns on the road 16 and at least one matching tracked characteristic of the vehicles 26 that previously passed behind the obstruction 30.

In accordance with the second exemplary embodiment, a portion of the collected traffic information may be divided into a plurality of segments 134, wherein each of the segments 134 represents a portion of the map 120 traversed by vehicles 126. A vector may be assigned to each of the segments 134, wherein each of the vectors is indicative of a direction commonly traveled by vehicles 126 within the segment 134 and an average speed of vehicles 126 within the segment 134. The vectors may be calculated based on the collected traffic information.

Also, an effect of one or more traffic influences 128 on at least one vehicle 126 that passes behind the obstruction 130 may be calculated.

Figure 6:
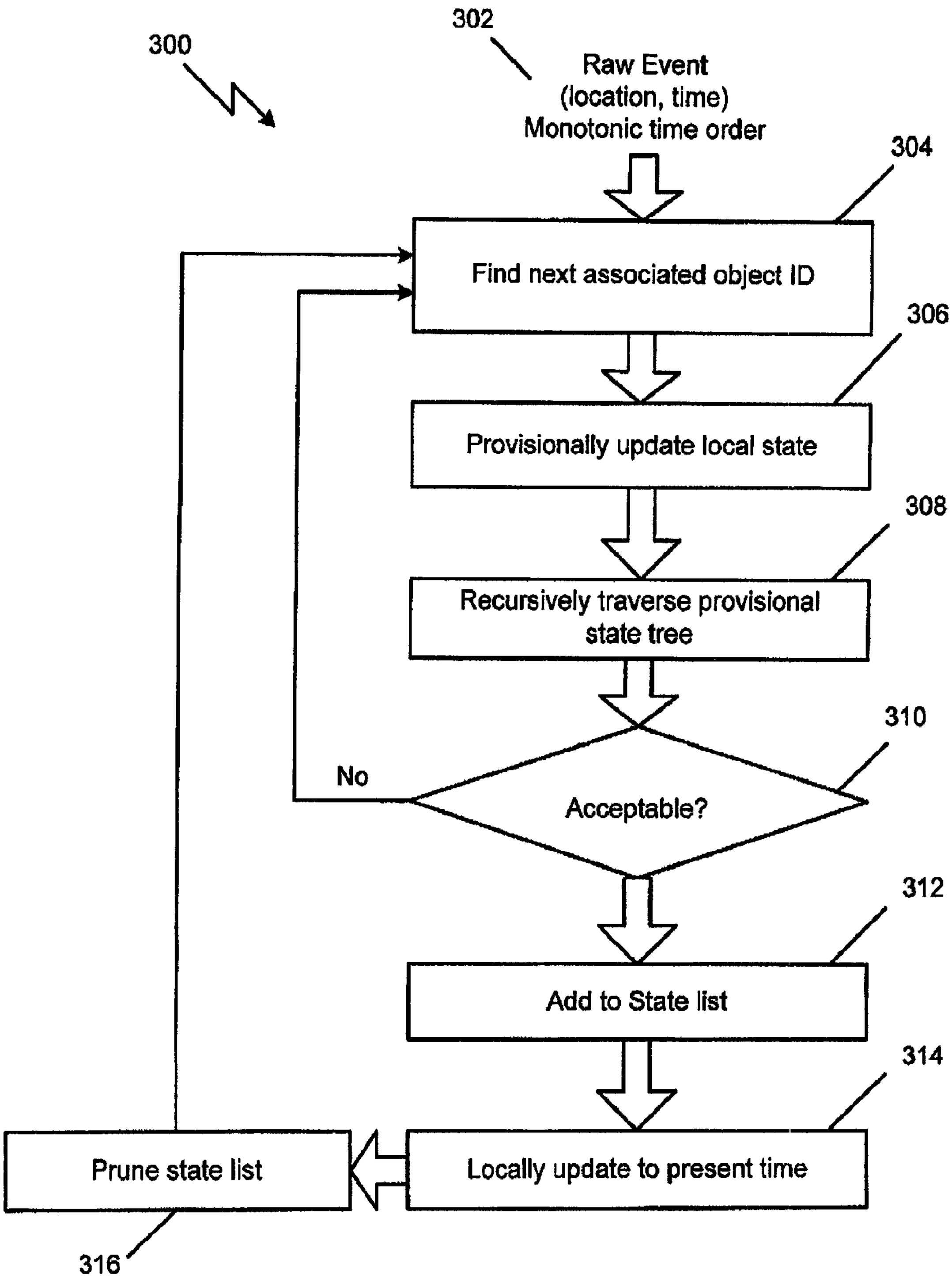
FIG. 6 is a flow chart illustrating a basic processing loop for first program and the second program of the traffic monitoring system of FIG. 2, in accordance with the second exemplary embodiment.

FIG. 6 is a flow chart 300 illustrating a basic processing loop for first program 124 and the second program 136 of the traffic monitoring system of FIG. 2, in accordance with the second exemplary embodiment, having blocks defined herein:

Raw Event Input (block 302). A raw event coming in could be tracks of one or more vehicles 126, traffic influence 128 detections from the video sensors, or processed tracks of vehicles from a tracker, among many possibilities. The processing presents events to the algorithm in temporal order, but processing may be continued without fixed space sampling, or even for sample rates high enough to avoid ambiguities. The algorithm may be effective with limited data, including sensor gaps or obstructions 130.

Event/ID association (block 304). Objects may be associated with ID tags through physical location of the objects. An object that is predicted to be close to a traffic influence 128 is provisionally associated with the traffic influence 128 for further processing.

Provisionally update state (block 306). The potentially associated traffic influence 128 may be run through a state transition algorithm. That algorithm may generate a series of consequences based on the knowledge of how vehicles behave on roads and interact with each other and with the traffic influence 128. This step uses the traffic model and prior knowledge to generate a state together with a probability.

Recursively traverse provisional state tree (block 308). In this step, state by state, the consequences of each provisional state update are generated. The consequences may be a complex series of sub events generated by the provisional state update of a single traffic influence 128.

Acceptable? (block 310). Tests are done on each consequence to determine whether the consequence is likely enough to be accepted as a possible new state. The tests use much of the knowledge of how vehicles 126 behave on the map 120 to prune the acceptable consequences.

Add to state list (block 312). If accepted, the new state is added to the state list. If not, then go to the next event/ID association.

Update local states to new event time (block 314). Local states are updated using the monotonic nature of timed input events to keep the state model in sync with the input.

Prune state list (block 316). Over time the number of states may grow substantially, depending on how the thresholds are set for generating low probability states. States that once were previously significantly probable to be generated and maintained become marginalized into low enough probabilities that they are removed at this step. After pruning, a new event/ID association is chosen, until there are no more available.

It should be emphasized that the above-described embodiments, particularly, any "preferred" embodiments, are merely possible examples of implementations, merely set forth for a clear understanding of the principles. Many variations and modifications may be made to the above-described embodiments without departing substantially from the spirit and principles of the disclosure. All such modifications and variations are intended to be included herein within the scope of this disclosure and protected by the following claims.

What is claimed is:

1. A traffic monitoring system, comprising:

a programmable device having a tangible computer readable medium;

at least one camera in communication with the programmable device, the camera directed towards at least one road and configured to provide a camera signal to the programmable device, wherein the tangible computer readable medium includes a first program for tracking vehicles; and a map of an area that includes the road, wherein the map is stored in a tangible memory of the programmable device and wherein a plurality of traffic influences are defined in the map;

wherein the first program recognizes at least one obstruction between the at least one camera and the at least one road based on the camera signal and communicates with the map to identify at least one of the traffic influences behind the obstruction; and a second program on the tangible computer readable medium for calculating an effect of the traffic influence on at least one vehicle that passes behind the obstruction.

2. The system of claim 1, wherein calculating the effect of the traffic influence on at least one vehicle that passes behind the obstruction comprises:

receiving a raw event input;

associating the raw event with one or more objects;

provisionally updating a local state by generating a series of consequences based on a knowledge base which describes how one or more vehicles interact in response to the traffic influence; and accepting consequences which exceed a likelihood threshold.

3. The system of claim 1, further comprising a plurality of tags, wherein each of the tags is associated with a vehicle on the road and wherein each tag includes identification of at least a color and one dimension of the vehicle to which each tag is associated.

4. The system of claim 1, wherein the map further comprises a plurality of segments, wherein each of the segments represents a portion of the map traversed by vehicles.

5. The system of claim 4, wherein each of the segments further comprises a vector indicative of a direction commonly traveled by vehicles within the segment and an average speed of vehicles within the segment.

6. The system of claim 5, wherein each vector is a representative averaging of at least a portion of collected traffic information.

7. A method for monitoring traffic, the method comprising the steps of:

directing at least one camera towards at least one road;

collecting traffic information from the at least one road through the at least one camera;

communicating the collected traffic information to a programmable device;

comparing collected traffic information with a map of an area that includes the road, wherein the map is stored in a tangible computer readable memory of the programmable device and wherein a plurality of traffic influences are defined in the map; and tracking vehicles on the road, wherein a in the tangible computer readable memory first program recognizes at least one obstruction between the at least one camera and the at least one road based on the camera signal and communicates with the map to identify at least one of the traffic influences obscured by the camera obstruction; and calculating an effect of the traffic influences on at least one vehicle that passes behind the obstruction.

8. The method of claim 7, wherein calculating the effect of the traffic influence on at least one vehicle that passes behind the obstruction comprises:

receiving a raw event input;

associating the raw event with one or more objects;

provisionally updating a local state by generating a series of consequences based on a knowledge base which describes how one or more vehicles interact in response to the traffic influence; and accepting consequences which exceed a likelihood threshold.

9. The method of claim 8, further comprising the step of predicting behavior of at least one vehicle that passes behind the camera obstruction based on vehicle behavior patterns on the road.

10. The method of claim 8, further comprising the step of matching vehicles passing out from obscuration of the camera obstruction with vehicles that previously passed behind the obstruction based on vehicle behavior patterns on the road and at least one matching tracked characteristic of the vehicles that previously passed behind the camera obstruction.

11. The method of claim 8, further comprising the step of dividing at least a portion of the collected traffic information into a plurality of segments, wherein each of the segments represents a portion of the map traversed by vehicles.

12. The method of claim 11, further comprising the step of assigning a vector to each of the segments, wherein each of the vectors is indicative of a direction commonly traveled by vehicles within the segment and an average speed of vehicles within the segment.

13. The method of claim 12, further comprising the step of calculating the vectors from the collected traffic information.

14. The method of claim 7, further comprising the step of calculating an effect of the traffic influence on at least one vehicle that passes behind the camera obstruction.

15. The method of claim 7, further comprising the step of maintaining a plurality of tags within the programmable device, wherein each of the tags is associated with one of the vehicles on the road and wherein each tag includes identification of at least a color and one dimension of the vehicle to which each tag is associated.

16. A system for monitoring traffic, the system comprising:

at least one camera directed towards at least one road for collecting traffic information concerning the at least one road and for tracking vehicles on the road, a computer having a computer readable program stored in a tangible computer readable medium for:

comparing collected traffic information with a stored map of an area that includes the road, wherein a plurality of traffic influences are defined in the map, recognizing at least one obstruction between the at least one camera and the at least one road based on the camera signal, and communicating with the map to identify at least one of the traffic influences obscured by the obstruction; and calculating an effect of the traffic influences on at least one vehicle that passes behind the at least one obstruction.

17. The system of claim 16, wherein calculating the effect of the traffic influence on at least one vehicle that passes behind the obstruction comprises:

receiving a raw event input;

associating the raw event with one or more objects;

provisionally updating a local state by generating a series of consequences based on a knowledge base which describes how one or more vehicles interact in response to the traffic influence; and accepting consequences which exceed a likelihood threshold.

18. The system of claim 17, further comprising predicting behavior of at least one vehicle that passes behind the camera obstruction based on vehicle behavior patterns on the road.

19. The system of claim 17, further comprising matching vehicles passing out from obscuration of the camera obstruction with vehicles that previously passed behind the obstruction based on the vehicle behavior patterns on the road and at least one matching tracked characteristic of the vehicles that previously passed behind the camera obstruction.

20. The system of claim 17, further comprising calculating an effect of the traffic influence on at least one vehicle that passes behind the camera obstruction.

* * * * *